United States Patent
Nakano et al.

(10) Patent No.: US 11,027,369 B2
(45) Date of Patent: Jun. 8, 2021

(54) LASER PEENING PROCESSING DEVICE AND LASER PEENING PROCESSING METHOD

(71) Applicant: Fuji Jukogyo Kabushiki Kaisha, Tokyo (JP)

(72) Inventors: Mayu Nakano, Tokyo (JP); Takafumi Adachi, Tokyo (JP)

(73) Assignee: FUJI JUKOGYO KABUSHIKI KAISHA SUBARU CORPORATION, Tokyo (JP)

( * ) Notice: Subject to any disclaimer, the term of this patent is extended or adjusted under 35 U.S.C. 154(b) by 491 days.

(21) Appl. No.: 15/423,454

(22) Filed: Feb. 2, 2017

(65) Prior Publication Data

US 2017/0282298 A1 Oct. 5, 2017

(30) Foreign Application Priority Data

Mar. 30, 2016 (JP) .............................. JP2016-067451

(51) Int. Cl.
*B23K 26/356* (2014.01)
*C21D 10/00* (2006.01)
(Continued)

(52) U.S. Cl.
CPC .......... *B23K 26/356* (2015.10); *B23K 26/009* (2013.01); *B23K 26/0093* (2013.01);
(Continued)

(58) Field of Classification Search
CPC .............. B23K 26/1436; B23K 26/356; B23K 26/146; B23K 26/009; B23K 26/0093; B23K 26/02; B23K 26/08; C21D 10/005
(Continued)

(56) References Cited

U.S. PATENT DOCUMENTS 6,281,473 B1 8/2001 Wright, III et al.
6,483,578 B1 11/2002 Clauer et al.
(Continued)

FOREIGN PATENT DOCUMENTS

JP 2006-137998 A 6/2006
JP 2007-222897 9/2007
(Continued)

OTHER PUBLICATIONS

"Hydraulic Flow Control Valves" (Year: 2011).*
(Continued)

*Primary Examiner* — Phuong T Nguyen
*Assistant Examiner* — Bonita Khlok
(74) *Attorney, Agent, or Firm* — McGinn I.P. Law Group, PLLC.

(57) ABSTRACT

According to one implementation, a laser peening processing device includes a laser peening processing device includes a laser oscillator, a nozzle and an inclining structure. The laser oscillator emits laser light. The nozzle condenses and irradiates the laser light toward a surface to be processed of a workpiece, with injecting liquid toward the surface to be processed. The inclining structure inclines at least one of the nozzle and the workpiece to make an injection direction of the liquid be different from a normal direction of the surface to be processed. The air bubbles arising by at least one of collision between the liquid and the surface to be processed and shock by irradiation of the laser light on the surface to be processed are flowed in a direction depending on an inclined direction of the surface to the injection direction of the liquid.

5 Claims, 3 Drawing Sheets (51) Int. Cl.
*B23K 26/08* (2014.01)
*B23K 26/146* (2014.01)
*B23K 26/00* (2014.01)
*B23K 26/02* (2014.01)

(52) U.S. Cl.
CPC .............. *B23K 26/02* (2013.01); *B23K 26/08* (2013.01); *B23K 26/146* (2015.10); *C21D 10/005* (2013.01)

(58) Field of Classification Search
USPC ...................................................... 219/121.6
See application file for complete search history.

(56) References Cited

U.S. PATENT DOCUMENTS

| | | | |
|---|---|---|---|
| 6,841,755 | B2 | 1/2005 | Dykes et al. |
| 7,851,725 | B2 | 12/2010 | Dane et al. |
| 9,776,274 | B2* | 10/2017 | Zaffino .................. B23K 9/173 |
| 2006/0102604 | A1 | 5/2006 | Dane et al. |
| 2013/0032015 | A1* | 2/2013 | Nishikawa ......... B23K 26/0093 83/16 |
| 2013/0313232 | A1* | 11/2013 | Sano .................... B23K 26/067 219/121.62 |
| 2015/0239065 | A1 | 8/2015 | Nomura et al. |
| 2016/0288258 | A1 | 10/2016 | Nomura et al. |

FOREIGN PATENT DOCUMENTS

| | | |
|---|---|---|
| JP | 2008-049367 | 3/2008 |
| JP | 2008-520439 A | 6/2008 |
| JP | 2008-238260 A | 10/2008 |
| JP | 2015-155105 | 8/2015 |
| JP | 2017-064734 | 4/2017 |
| WO | WO 2006/060207 A2 | 6/2006 |
| WO | WO 2006/060207 A3 | 6/2006 |

OTHER PUBLICATIONS

Japanese Office Action dated May 23, 2017, in Japanese Patent Application No. 2016-67451.
Extended European Search Report dated Aug. 28, 2017 in European Application No. 17158115.0.
Japanese Decision of Refusal dated Nov. 28, 2017 in Japanese Application No. 2016-067451 with an English translation thereof.
English translation of Notification of Reasons for Refusal dated May 23, 2017 in Japanese Application No. 2016-067451.
Chinese Office Action dated Nov. 15, 2019, in Chinese co-pending Patent Application No. 201710111730.2, with an English translation thereof.
Chinese Office Action dated Jul. 3, 2020, in Chinese co-pending Patent Application No. 201710111730.2, with an English translation thereof.
Communication Pursuant to Article 94(3) EPC dated Mar. 11, 2021, in corresponding European Patent Application No.17 158 115.0.

* cited by examiner

LASER PEENING PROCESSING DEVICE AND LASER PEENING PROCESSING METHOD

CROSS REFERENCES TO RELATED APPLICATIONS

This application is based upon and claims the benefit of priority from Japanese Patent Application No. 2016-067451, filed on Mar. 30, 2016; the entire contents of which are incorporated herein by reference.

FIELD

Implementations described herein relate generally to a laser peening processing device and a laser peening processing method.

BACKGROUND

Laser peening processing is performed by condensing and irradiating a laser beam on a surface to be processed of a workpiece in a state where the surface to be processed is covered with liquid. When a laser beam is condensed and irradiated on a surface to be processed of a workpiece covered with liquid, plasma generated by irradiation of the laser beam can be sealed in the liquid. As a result, a pressure of a shock wave is applied to the surface to be processed. Thereby, a compressive stress arising inside the workpiece can be made to remain as a residual stress.

In the laser peening processing, it is important to suppress generation of air bubbles in the liquid. This is because an energy of a laser beam which arrives at a surface to be processed attenuates due to the air bubbles. Thus, a technique which disposes a valve on piping for supplying the liquid for laser peening in order to remove the air bubbles from the liquid has been proposed. Furthermore, a technique which prevents generation of air bubbles by cavitation, by controlling a flow velocity and a flow rate of the liquid has also been proposed. (For example, refer to Japanese Patent Application Publication JP 2008-238260 A and Japanese Patent Application Publication JP 2006-137998 A.)

However, when a laser beam is irradiated on a surface to be processed of a workpiece, air bubbles arise at the focused point of the laser beam. In other words, air bubbles are generated at a processing point of the laser peening processing. As a result, there is a problem that the optical path of the laser beam is interrupted by the air bubbles, and therefore, the energy of the laser beam attenuates. That is, the problem is that laser peening processing cannot be performed with a set energy of laser beam strictly due to the air bubbles arising at an irradiation point of the laser beam.

Thus, an object of the present invention is to reduce attenuation in energy of laser beam by bubbles, in laser peening processing.

SUMMARY OF THE INVENTION

In general, according to one implementation, a laser peening processing device includes a laser oscillator, a nozzle and an inclining structure. The laser oscillator emits laser light. The nozzle condenses and irradiates the laser light toward a surface to be processed of a workpiece, with injecting liquid toward the surface to be processed. The inclining structure inclines at least one of the nozzle and the workpiece to make an injection direction of the liquid be different from a normal direction of the surface to be processed. The air bubbles arising by at least one of collision between the liquid and the surface to be processed and shock by irradiation of the laser light on the surface to be processed are flowed in a direction depending on an inclined direction of the surface to the injection direction of the liquid.

Further, according to one implementation, a laser peening processing method includes: emitting laser light; producing a product or a semi-product by condensing and irradiating the laser light toward a surface to be processed of a workpiece, with injecting liquid toward the surface to be processed; and inclining at least one of the nozzle and the workpiece to make an injection direction of the liquid be different from a normal direction of the surface to be processed. Air bubbles arising by at least one of collision between the liquid and the surface to be processed and shock by irradiation of the laser light on the surface to be processed are flowed in a direction depending on an inclined direction of the surface to the injection direction of the liquid.

DETAILED DESCRIPTION

A laser peening processing device and a laser peening processing method according to implementations of the present invention will be described with reference to the accompanying drawings.

(First Implementation)
(Structure and Function)

Figure 1:
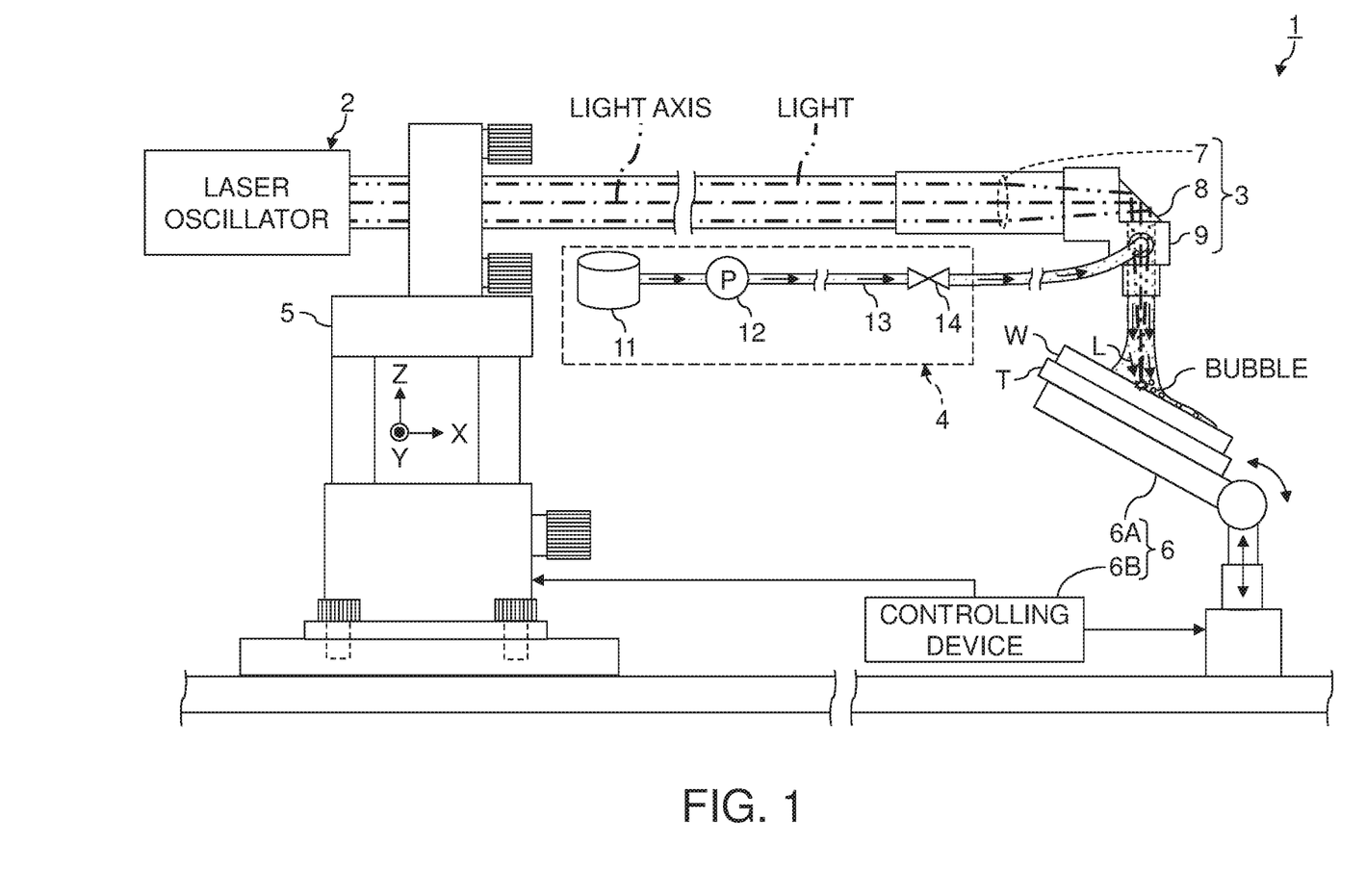
FIG. 1 shows a structure of a laser peening processing device according to the first implementation of the present invention.

FIG. 1 shows a structure of a laser peening processing device according to the first implementation of the present invention.

A laser peening processing device 1 performs laser peening processing by irradiating a laser beam with injecting a desired liquid L, such as water, on a surface to be processed of a workpiece W, such as metal. The laser peening processing is to apply a pressure of a shock wave on the surface to be processed of the workpiece W by condensing and irradiating a laser beam to the surface to be processed in a state where the liquid L has been attached to the surface to be processed. When the laser peening processing is performed, a compressive residual stress can be applied, as a reaction force, to the surface to be processed of the workpiece W by the pressure of the shock wave. When the compressive residual stress is applied to the surface to be processed of the workpiece W, generation of a crack on the surface to be processed can be suppressed by the formed compressive residual stress. Thereby, fatigue characteristics of the workpiece W can be improved.

The laser peening processing device 1 can be composed of a laser oscillator 2, a nozzle 3, a liquid supply system 4, a moving structure 5, and an inclining structure 6 as exemplified in FIG. 1.

The laser oscillator 2 emits a laser light to irradiate the emitted laser light toward the nozzle 3. Desired optical systems, such as a noise filter, can be disposed between the laser oscillator 2 and the nozzle 3.

The nozzle 3 is configured to condense and irradiate the laser light on the surface to be processed of the workpiece W with injecting the liquid L for laser peening processing toward the surface to be processed. The nozzle 3 can be composed using a condensing lens 7, an optical element 8, and a liquid reservoir 9.

The condensing lens 7 is an optical element for inputting and condensing a laser light emitted from the laser oscillator 2. Therefore, the condensing lens 7 is disposed so as to be on a light axis of the laser light emitted from the laser oscillator 2, inside a tubular structure for covering the laser light.

The nozzle 3 can have the optical element 8 besides the condensing lens 7. The optical element 8 changes the traveling direction of the laser light which has transmitted the condensing lens 7 in order to irradiate the laser light on the surface to be processed of the workpiece W. When the optical element 8 which changes the traveling direction of the laser light is disposed, the laser light can be irradiated toward a desired direction.

In the example shown in the figure, a prism which bends the light axis at a right angle is disposed as the optical element 8. A prism is a polyhedron made of a transparent medium, such as glass or crystal, which has a refractive index different from each refractive index in the incident side and the output side of light. As a matter of course, a mirror may also be used instead of a prism. Alternatively, the traveling direction of the laser light may be changed using an optical fiber.

The liquid reservoir 9 is a vessel for temporarily reserving and injecting the liquid L for laser peening processing of the workpiece W. The liquid reservoir 9 has a supply port and an injection port of the liquid L, and can inject the liquid L, supplied from the supply port, toward the surface to be processed of the workpiece W from the injection port.

Furthermore, the liquid reservoir 9 has an incident window. Then, the laser light which has transmitted the incident window through the optical element 8 is output in the same direction as an injection direction of the liquid L. That is, the injection port of the liquid L also serves as an outlet of the laser light, and the laser light is irradiated toward the surface to be processed of the workpiece W from the injection port of the liquid L.

Therefore, the light axis of the laser light is approximately the same direction as the injection direction of the liquid L. That is, the nozzle 3 is configured to inject the liquid L and irradiate the laser light so that the injection direction of the liquid L becomes the same direction as the irradiating direction of the laser light. Thus, the incident window and the injection port of the liquid reservoir 9 are disposed to reside on the light axis of the laser light.

The liquid L can be injected while the laser light can be irradiated so that the injection direction of the liquid L and the irradiation direction of the laser light become vertically downward by disposing the optical element 8, such as a prism. In this case, the liquid L can be injected using gravity in addition to a liquid pressure.

The size of the injection port of the liquid L is preferable to be made larger than the beam diameter of the laser light. Thereby, the diameter of a flow of the liquid L becomes larger than the beam diameter of the laser light so that the laser light transmits in the liquid L to be irradiated on the surface to be processed of the workpiece W. That is, it is preferable to make the laser light transmit in a liquid column formed by a flow of the liquid L.

The liquid supply system 4 supplies the liquid L for laser peening processing to the liquid reservoir 9 of the nozzle 3. The liquid supply system 4 can be composed of a tank 11, a pump 12, and piping 13. The tank 11 reserves the liquid L for laser peening processing. The piping 13 can have a valve 14 as necessary.

The piping 13 forms a fluid channel of the liquid L between the tank 11 and the liquid reservoir 9. The pump 12 and the valve 14 are disposed on the piping 13. Therefore, when the pump 12 operates, the liquid L in the tank 11 can be supplied to the liquid reservoir 9. Furthermore, a liquid pressure can be adjusted by opening and closing of the valve 14. Therefore, the valve 14 takes a role of a pressure control mechanism which controls a pressure of the liquid L injected toward the surface to be processed of the workpiece W.

The moving structure 5 is a device which slides at least one of the nozzle 3 and the workpiece W to the other. That is, the moving structure 5 has a function to move the nozzle 3 relatively to the workpiece W. For example, the moving structure 5 can be composed of a three axis slide structure which can move the nozzle 3 in parallel in three axis directions consisting of X-axis, Y-axis, and Z-axis orthogonal to each other. As a matter of course, the moving structure 5 may be composed using an inclining structure and/or a rotating structure. Thus, laser peening processing can be performed continuously with changing a processing point by driving the moving structure 5.

The inclining structure 6 is a device which inclines the workpiece W so that the injection direction of the liquid L for laser peening processing becomes different from the normal direction of the surface to be processed of the workpiece W. That is, the inclining structure 6 is a device which inclines the workpiece W so that the liquid L is not injected perpendicularly to the surface to be processed of the workpiece W, with keeping a distance between a laser peening processing position on the surface to be processed of the workpiece W and the nozzle 3 constant in order to make the focus of the laser light lie on the laser peening processing position.

When the laser peening processing is performed, air bubbles arise from the surface to be processed of the workpiece W, on which the laser light has been irradiated, due to collision between the liquid L and the surface to be processed and/or a shock caused by irradiating the laser light on the surface to be processed. When the air bubbles accumulate in the liquid L for laser peening processing, the optical path of the laser light is interrupted, which may lead to scattering or attenuation of the laser light. Therefore, it is important to remove the air bubbles out of the liquid L for laser peening processing in order to apply a sufficient pressure of a shock wave on the surface to be processed in the laser peening processing.

As a result of observing laser peening processing, it became clear that the air bubbles generated by irradiation of the laser light tended to accumulate in stagnation where a flow of the liquid L was stagnant. Therefore, when stagnation in an irradiation area of the laser light is reduced, it can be avoided that the air bubbles locally remain at the irradiation area of the laser light.

Figure 2:
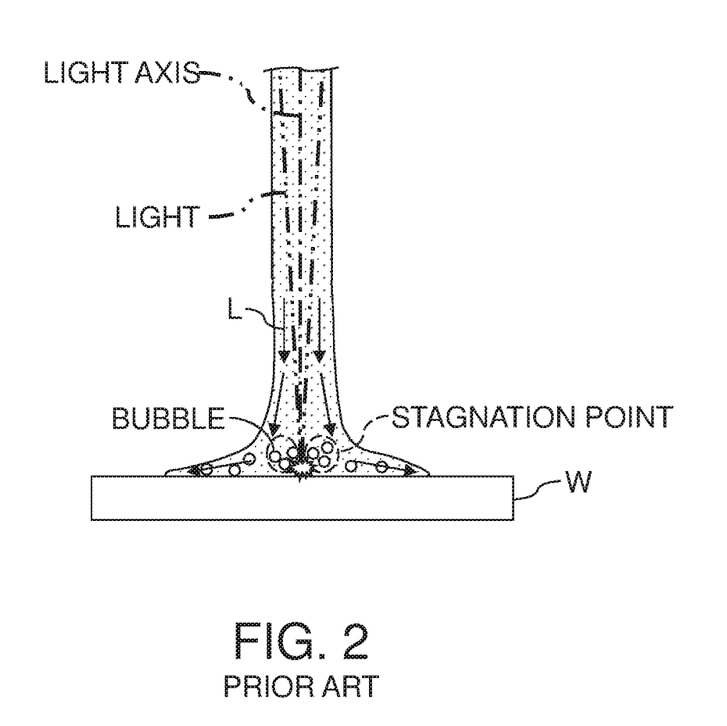
FIG. 2 shows an aspect of stagnation caused by the conventional laser peening processing method.

FIG. 2 shows an aspect of stagnation caused by the conventional laser peening processing method.

As shown in FIG. 2, when the liquid L for laser peening processing is injected perpendicularly to the surface to be processed of the workpiece W, stagnation of the liquid L arises around the irradiation spot of the laser light on the surface to be processed. Therefore, the air bubbles formed by the irradiation of the laser light remain around the irradiation spot. As a result, the optical path of the laser light is interrupted with the air bubbles, which leads to scattering or attenuation of the laser light.

Thus, the workpiece W can be inclined by the inclining structure 6 as exemplified in FIG. 1. Thereby, it can be avoided that stagnation which arises in the liquid L concentrates near an irradiation area of the laser light. Specifically, when the workpiece W is inclined, the liquid L flows obliquely downward. That is, a flow of the liquid L is formed. As a result, a generation amount of stagnation in the liquid L can be reduced. Even when stagnation arises, the stagnation also flows obliquely downward from an irradiation area of the laser light along the flow of the liquid L. As a result, air bubbles, which are caused by a collision between the liquid L and the surface to be processed of the workpiece W and a shock due to the irradiation of the laser light on the surface to be processed, can be flowed obliquely downward with the liquid L, without remaining at the stagnation.

In the example shown in FIG. 1, the injection direction of the liquid L and the irradiation direction of the laser light are vertically downward. The injection direction of the liquid L and the irradiation direction of the laser light may also be different from the vertically downward direction depending on a structure of the workpiece W. In that case, the liquid L can be also flowed in a specific direction depending on an inclined direction of the surface to be processed of the workpiece W, to the injection direction of the liquid L when the workpiece W is inclined by the inclining structure 6 so that the injection direction of the liquid L becomes different from the normal direction of the surface to be processed. Therefore, air bubbles caused by laser peening processing can be flowed with the liquid L in a direction depending on an inclined direction of the surface to be processed to the injection direction of the liquid L.

The inclining structure 6 can be composed of a robot arm 6A and a controlling device 6B, for example. The robot arm 6A can variably control an inclined angle of the surface to be processed of the workpiece W to the injection direction of the liquid L for laser peening processing, with keeping a focus of the laser light on the surface to be processed of the workpiece W. The controlling device 6B controls the robot arm 6A. The robot arm 6A can be composed using the necessary number of rotating structures, and expansion and contraction structures. The robot arm 6A may be composed using a plurality of rotating structures so that inclined angles in two directions can be adjusted. Meanwhile, the controlling device 6B, which controls the robot arm 6A, can be composed of electronic circuitry, such as a computer.

More specifically, the controlling device 6B can be implemented by circuitry including at least one semiconductor integrated circuit such as at least one processor (e.g., a central processing unit (CPU)), at least one application specific integrated circuit (ASIC), and/or at least one field programmable gate array (FPGA). At least one processor can be configured, by reading instructions from at least one machine readable tangible medium, to perform all or a part of functions of the controlling device 6B. Such a medium may take many forms, including, but not limited to, any type of magnetic medium such as a hard disk, any type of optical medium such as a compact disc (CD) and a digital versatile disk (DVD), any type of semiconductor memory (i.e., semiconductor circuit) such as a volatile memory and a nonvolatile memory. The volatile memory may include a dynamic random access memory (DRAM) and a static random access memory (SRAM), and the nonvolatile memory may include a read-only memory (ROM) and a non-volatile random access memory (NVRAM). The ASIC is an integrated circuit (IC) customized to perform, and the FPGA is an integrated circuit designed to be configured after manufacturing in order to perform, all or a part of the functions of the modules shown in FIG. 1.

In the example shown in FIG. 1, the workpiece W has been attached to a jig T, and the jig T is held by the robot arm 6A. As a matter of course, the workpiece W may be held directly by the robot arm 6A. That is, the inclining structure 6 can be composed of the robot arm 6A which holds the workpiece W or the jig T for attaching the workpiece W.

Furthermore, not only limited to the robot arm 6A, the inclining structure 6 may also be composed of a tilting structure, having a rotating shaft, which can incline the workpiece W or the jig T for attaching the workpiece W. In that case, a controlling device for controlling the tilting structure is installed.

The surface to be processed of the workpiece W is not necessarily flat. For example, when the workpiece W is an aircraft part, the surface to be processed may have concavity and convexity and/or the surface to be processed may be a curved surface. Therefore, when laser peening processing is performed with changing a relative position of the nozzle 3 to the workpiece W by driving the moving structure 5, the angle formed between the injection direction of the liquid L and the normal direction of the surface to be processed may change. Thus, the workpiece W can be inclined so that the inclined angle of the surface to be processed to the injection direction of the liquid L becomes constant or within a predetermined range during sliding at least one of the nozzle 3 and the workpiece W, based on three-dimensional information showing a shape of the surface to be processed.

When laser peening processing is performed with changing the inclined angle of the surface to be processed of the workpiece W, a parallel translation of the workpiece W is necessary in addition to a rotation movement of the workpiece W in order to keep a focus of the laser light on the surface to be processed of the workpiece W, unless a rotating axis of the workpiece W overlaps a laser peening processing position. For example, when the inclined angle of the workpiece W is changed by the robot arm 6A as shown in FIG. 1, it is necessary to move the workpiece W in parallel in the vertical direction. Thus, the robot arm 6A can have a plurality of rotating shafts, or the robot arm 6A can have an expansion and contraction structure which is composed of a cylinder structure or the like so that the workpiece W can be moved in parallel.

Furthermore, a parallel translation of the nozzle 3 by the moving structure 5 may be performed in conjunction with a rotation movement of the workpiece W. In that case, the moving structure 5 can also be controlled by the controlling device 6B, based on the three-dimensional information showing a shape of the surface to be processed. Therefore, it can also be said that the moving structure 5 functions as a part of the inclining structure 6.

The three-dimensional information showing a shape of the surface to be processed can be previously stored in a storage which is provided in the controlling device 6B. Then, an inclined angle of the surface to be processed to the injection direction of the liquid L can be kept so that the inclined angle becomes constant or within a predetermined range, by the robot arm 6A under the control of the controlling device 6B referring to the three-dimensional information of the surface to be processed. In addition, at least one of the robot arm 6A and the moving structure 5 can be controlled by the controlling device 6B referring to the three-dimensional information of the surface to be processed so that a focus of the laser light becomes on the surface to be processed.

The amount of stagnation of the liquid L caused by collision between the liquid L and the surface to be processed also changes depending on a liquid pressure of the liquid L. Thus, the pressure of the liquid L can be controlled by the valve 14 as the pressure control mechanism, which controls the pressure of the liquid L, so as to reduce the stagnation. Specifically, the generation amount of the stagnation can be reduced by adjusting the opening of the valve 14. The appropriate opening of the valve 14 for reducing the stagnation can be obtained empirically by tests.

Note that, as long as the pressure of the liquid L can be controlled, a device other than the valve 14 can be used as the pressure control mechanism. In that case, the pressure of the liquid L can also be controlled by the pressure control mechanism so as to reduce the generation amount of the stagnation.

As described above, the laser peening processing device 1 can avoid that air bubbles in stagnation remain near an irradiation area of the laser light, by adjusting the pressure of the liquid L and the inclined angle of the surface to be processed.

(Operation and Action)

Next, a laser peening processing method using the laser peening processing device 1 will be described.

Firstly, the workpiece W is fixed to the robot arm 6A through the jig T. Alternatively, the workpiece W is directly fixed to the robot arm 6A. Then, positioning of the workpiece W is performed by driving the moving structure 5 so that a focus of the laser light irradiated from the nozzle 3 becomes a start position of laser peening processing on the surface to be processed of the workpiece W. Furthermore, the robot arm 6A is driven under the control by the controlling device 6B so that the normal direction of the surface to be processed of the workpiece W is inclined by a predetermined angle to the injection direction of the liquid L injected from the nozzle 3 and the irradiation direction of the laser light irradiated from the nozzle 3.

Next, the laser oscillator 2 emits the laser light. In other words, the laser light is output from the laser oscillator 2. The output laser light enters the condensing lens 7 inside the nozzle 3 through a desired optical system. The laser light, which has entered the condensing lens 7, transmits the condensing lens 7 with being condensed. The laser light, which has transmitted the condensing lens 7, enters the optical element 8. The traveling direction of the laser light, which has entered the optical element 8, is changed to vertically downward by the optical element 8 to be output.

Meanwhile, the pump 12 of the liquid supply system 4 operates, and the liquid L for laser peening processing in the tank 11 is supplied into the liquid reservoir 9 through the piping 13. As a result, the liquid L is injected toward the surface to be processed of the workpiece W from the opening part which has been formed on the lower side of the liquid reservoir 9. Thereby, the laser light, which has been output from the optical element 8, transmits inside the liquid L to be condensed and irradiated toward the surface to be processed of the workpiece W. That is, the nozzle 3 condenses and irradiates the laser light toward the surface to be processed of the workpiece W with injecting the liquid L toward the surface to be processed of the workpiece W.

Consequently, plasma arises on the surface to be processed of the workpiece W. Thereby, a pressure of a shock wave is applied to the surface to be processed of the workpiece W. Then, strengths of the surface can be increased by a residual stress.

At this time, the workpiece W has inclined so that the injection direction of the liquid L becomes different from the normal direction of the surface to be processed. Thereby, the liquid L, which has been injected to the surface to be processed, flows along the surface to be processed toward a direction where the angle formed between the surface to be processed and the injection direction of the liquid L becomes the largest. As a result, the number of generated stagnation points in the liquid L is reduced. Even when local stagnation has arisen due to the collision between the surface to be processed and the liquid L, the stagnation is immediately flowed from an irradiation area of the laser light along with the flow of the liquid L. Thereby, air bubbles which arise due to the collision between the liquid L and the surface to be processed and a shock by the laser light can also be flowed with the liquid L in a direction corresponding to an inclined direction of the surface to be processed to the injection direction of the liquid L.

Therefore, the laser light is irradiated on the surface to be processed of the workpiece W without being interrupted by many air bubbles. That is, the laser light having a sufficient energy density is irradiated on the surface to be processed of the workpiece W. As a result, strengths of the processed surface can certainly be improved.

When the surface to be processed of the workpiece W is large, the laser peening processing can be performed sequentially with relatively moving the workpiece W by driving the moving structure 5. Then, a processed product can be obtained after the laser peening processing of the entire surface to be processed is completed. That is, a product or a semi-product to which the laser peening processing has been applied can be manufactured.

Note that, when the workpiece W is not a plane, an inclined angle of the surface to be processed can be variably controlled following a movement of the workpiece W. In that case, the controlling device 6B controls the robot arm 6A so that an inclined angle of the surface to be processed to the injection direction of the liquid L becomes constant or within a predetermined range, based on the three-dimensional information showing a shape of the surface to be processed. Thereby, the inclined angle of the surface to be processed to the injection direction of the liquid L can be kept constant or within a predetermined range, thereby it can be avoided that air bubbles which arise by the laser peening processing remain at an irradiation area of the laser light.

Furthermore, a pressure of the liquid L can be controlled so as to reduce stagnation which becomes a factor causing air bubbles to remain. The pressure of the liquid L can be controlled by adjusting the opening of the valve 14.

That is, the laser peening processing device 1 and the laser peening processing method as described above are made by focusing attention on a characteristic that air bubbles which arise by laser peening processing accumulate in stagnation of the liquid L for laser peening processing, and allow inclining the normal direction of the surface to be processed of the workpiece W to the injection direction of the liquid L injected from the nozzle 3 and the irradiation direction of the laser light so that a generated amount of stagnation near each laser peening processing position is reduced.

(Effects)

Accordingly, the laser peening processing device 1 and the laser peening processing method can reduce an amount of stagnation points of the liquid L which remain near each processing point of laser peening processing. Thereby, air bubbles which arise by the laser peening processing near each processing point of the laser peening processing can be removed. As a result, attenuation in energy of the laser beam due to the air bubbles can be reduced. That is, the laser peening processing can be performed under more preferable conditions.

(Second Implementation)

Figure 3:
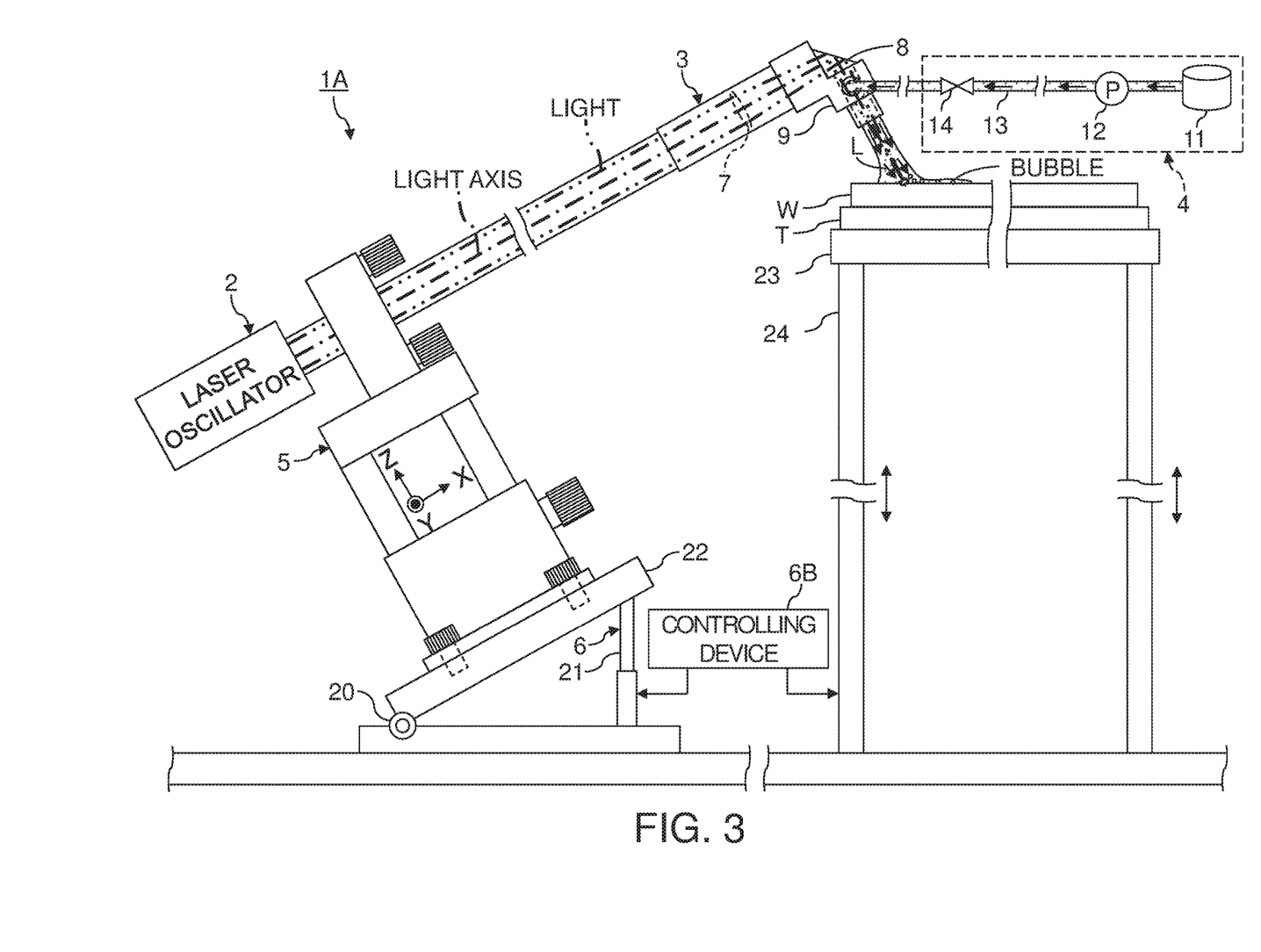
FIG. 3 shows a structure of a laser peening processing device according to the second implementation of the present invention.

FIG. 3 shows a structure of a laser peening processing device according to the second implementation of the present invention.

A laser peening processing device 1A in the second implementation shown in FIG. 3 is different from the laser peening processing device 1 in the first implementation in a point that an inclined angle of the nozzle 3 to the surface to be processed of the workpiece W can be variably controlled by the inclining structure 6. Other structures and functions of the laser peening processing device 1A in the second implementation are not substantially different from those of the laser peening processing device 1 in the first implementation. Therefore, the same structures or corresponding structures are shown by the same signs, and their explanations are omitted.

The inclining structure 6 of the laser peening processing device 1A in the second implementation is coupled to the nozzle 3. Therefore, an inclined angle of the nozzle 3 to the surface to be processed of the workpiece W can be variably controlled. For example, the inclining structure 6 can be composed using a rotating shaft 20 and cylinder structures 21 which extend and contract, as shown in FIG. 3. Specifically, the inclining structure 6 which can variably control an inclined angle of the nozzle 3 can be composed of the cylinder structures 21, each extending and contracting, which support one end of the lower part of a table 22 which also serves as a part of the moving structure 5, and the rotating shaft 20 which rotatably supports the other end of the table 22. Therefore, the inclining structure 6 may also be an element of the moving structure 5.

On the other hand, a height adjusting structure 24 can be disposed. The height adjusting structure 24 adjusts a height of a table 23 for placing the workpiece W or the jig T for the workpiece W so that a focus of the laser light becomes a laser peening processing position on the surface to be processed of the workpiece W. The height adjusting structure 24 can be controlled by the controlling device 6B. Therefore, it can be said that the height adjusting structure 24 also composes a part of the inclining structure 6 which inclines the workpiece W so that the liquid L is not injected perpendicularly to the surface to be processed of the workpiece W, with keeping a distance between each laser peening processing position and the nozzle 3 constant. The height adjusting structure 24 can be composed using cylinder structures, ball screws, or the like. As a matter of course, a height of the nozzle 3 may be adjusted by the moving structure 5, instead of adjusting the height of the table 23 for placing the jig T for the workpiece W. Alternatively, both heights of the table 23 and the nozzle 3 may be adjusted.

The above-mentioned laser peening processing device 1A in the second implementation can also achieve effects similar to those of the laser peening processing device 1 in the first implementation. In particular, when the workpiece W is large-sized or a weight of the workpiece W is large, a large scale device can be made unnecessary since the inclination of the workpiece W can be made unnecessary.

Conversely, when the workpiece W has a small size or a weight of the workpiece W is small, the injection direction of the liquid L can constantly be vertically downward by inclining the workpiece W side as described in the first implementation. Thereby, the liquid L can be injected using the gravity. In addition, a large scale device can be made unnecessary for the inclination of the nozzle 3 and the moving structure 5.

(Other Implementations)

While certain implementations have been described, these implementations have been presented by way of example only, and are not intended to limit the scope of the invention. Indeed, the novel methods and systems described herein may be embodied in a variety of other forms; furthermore, various omissions, substitutions and changes in the form of the methods and systems described herein may be made without departing from the spirit of the invention. The accompanying claims and their equivalents are intended to cover such forms or modifications as would fall within the scope and spirit of the invention.

For example, the first implementation may be combined with the second implementation. Specifically, both inclined angles of the nozzle 3 and the workpiece W may be controlled. Therefore, the inclining structure 6 can be configured to incline at least one of the nozzle 3 and the workpiece W.

What is claimed is:

1. A laser peening processing device comprising:
a laser oscillator that emits laser light;
a nozzle that condenses and irradiates the laser light toward a surface to be processed of a workpiece, with injecting liquid toward the surface to be processed;
an arm that inclines the workpiece to make an injection direction of the liquid be different from a normal direction of the surface to be processed, air bubbles arising by at least one of collision between the liquid and the surface to be processed and shock by irradiation of the laser light on the surface to be processed being flowed in a direction depending on an inclined direction of the surface to the injection direction of the liquid;
a moving structure that slides, in parallel, the nozzle relative to the workpiece; and
control circuitry that controls the arm and the moving structure, a parallel translation of the nozzle by the moving structure being performed in conjunction with an inclination of the workpiece by the arm so that a focus of the laser light becomes on the surface to be processed by keeping a distance between a laser peening processing position on the surface to be processed and the nozzle constant,
wherein the arm inclines the workpiece to make an inclined angle of the surface to be processed, to the injection direction of the liquid, be constant or within a predetermined range during sliding the nozzle, the workpiece being inclined based on three-dimensional information showing a shape of the surface to be processed,
wherein the distance between the laser peening processing position on the surface to be processed and the nozzle is variably adjusted by the control circuitry controlling a vertical height of the arm until the distance between the laser peening processing position on the surface to be processed and the nozzle is constant, based on the shape of the surface to be processed,
wherein the injection direction of the liquid is same as an irradiation direction of the laser light,
wherein the injection direction of the liquid and the irradiation direction of the laser light are each vertically downward,
wherein the arm includes a robot arm that can variably control an inclined angle of the surface to be processed to the injection direction of the liquid, the robot arm holding the workpiece or a jig for attaching the workpiece, and wherein the robot arm has at least one rotating shaft and an expansion and contraction structure, further comprising a pressure control structure that controls a pressure of the liquid to reduce stagnation of the liquid, the stagnation arising due to the collision between the liquid and the surface to be processed.

2. The laser peening processing device according to claim 1, wherein the arm is coupled to the nozzle and variably controls an inclined angle of the nozzle to the surface to be processed.

3. A laser peening processing method comprising:

emitting laser light;

producing a product or a semi-product by condensing and irradiating the laser light toward a surface to be processed of a workpiece, with injecting liquid toward the surface to be processed;

inclining the workpiece to make an injection direction of the liquid be different from a normal direction of the surface to be processed, air bubbles arising by at least one of collision between the liquid and the surface to be processed and shock by irradiation of the laser light on the surface to be processed being flowed in a direction depending on an inclined direction of the surface to the injection direction of the liquid;

sliding the nozzle relative to the workpiece in parallel; and controlling the inclining and the sliding, a parallel translation of the nozzle by the sliding being performed in conjunction with an inclination of the workpiece by the inclining so that a focus of the laser light becomes on the surface to be processed by keeping a distance between a laser peening processing position on the surface to be processed and the nozzle constant, wherein the workpiece is inclined so that an inclined angle of the surface to be processed, to the injection direction of the liquid, becomes constant or within a predetermined range during sliding the nozzle, the workpiece being inclined based on three-dimensional information showing a shape of the surface to be processed, wherein the distance between the laser peening processing position on the surface to be processed and the nozzle is variably adjusted by controlling a vertical height of the arm until the distance between the laser peening processing position on the surface to be processed and the nozzle constant, based on the shape of the surface to be processed, wherein the injection direction of the liquid is same as an irradiation direction of the laser light, wherein the injection direction of the liquid and an irradiation direction of the laser light are each vertically downward, wherein the arm includes a robot arm that can variably control an inclined angle of the surface to be processed to the injection direction of the liquid, the robot arm holding the workpiece or a jig for attaching the workpiece, and wherein the robot arm has at least one rotating shaft and an expansion and contraction structure, further comprising controlling a pressure of the liquid to reduce stagnation of the liquid, the stagnation arising due to the collision between the liquid and the surface to be processed.

4. A laser peening processing device comprising:

a laser oscillator that emits laser light;

a nozzle that condenses and irradiates the laser light toward a surface to be processed of a workpiece, with injecting liquid toward the surface to be processed;

a rotating shaft that inclines the workpiece to make an injection direction of the liquid be different from a normal direction of the surface to be processed, air bubbles arising by at least one of collision between the liquid and the surface to be processed and shock by irradiation of the laser light on the surface to be processed being flowed in a direction depending on an inclined direction of the surface to the injection direction of the liquid;

a moving structure that slides, in parallel, the nozzle relative to the workpiece; and control circuitry that controls the rotating shaft and the moving structure, a parallel translation of the nozzle by the moving structure being performed in conjunction with an inclination of the workpiece by the rotating shaft so that a focus of the laser light becomes on the surface to be processed by keeping a distance between a laser peening processing position on the surface to be processed and the nozzle constant, wherein the rotating shaft inclines the workpiece to make an inclined angle of the surface to be processed, to the injection direction of the liquid, be constant or within a predetermined range during sliding the nozzle, the workpiece being inclined based on three-dimensional information showing a shape of the surface to be processed, and wherein, when the control circuitry controls the rotating shaft with the parallel translation, the control circuitry further performs a movement of the workpiece in a vertical direction, wherein the injection direction of the liquid is same as an irradiation direction of the laser light, wherein the injection direction of the liquid and an irradiation direction of the laser light are each vertically downward, wherein the arm includes a robot arm that can variably control an inclined angle of the surface to be processed to the injection direction of the liquid, the robot arm holding the workpiece or a jig for attaching the workpiece, and wherein the robot arm has at least one rotating shaft and an expansion and contraction structure, further comprising a pressure control structure that controls a pressure of the liquid to reduce stagnation of the liquid, the stagnation arising due to the collision between the liquid and the surface to be processed.

5. The laser peening processing device according to claim 1, wherein the expansion and contraction structure that is controlled by the control circuitry to variably adjust the vertical height of the arm.

* * * * *